United States Patent
Baba et al.

[11] Patent Number: 5,303,097
[45] Date of Patent: Apr. 12, 1994

[54] DISK SYNCHRONIZATION CONTROL SYSTEM AND METHOD

[75] Inventors: Hiroshi Baba; Toshio Matsumoto, both of Kanagawa, Japan

[73] Assignee: Mitsubishi Denki Kabushiki Kaisha, Tokyo, Japan

[21] Appl. No.: 878,331

[22] Filed: May 4, 1992

[30] Foreign Application Priority Data
May 13, 1991 [JP] Japan .................... 3-106219

[51] Int. Cl.$^5$ ...................... G11B 15/46; G11B 21/04
[52] U.S. Cl. ............... 360/73.02; 360/73.03; 360/70
[58] Field of Search ........... 360/78.03, 78.02, 73.03, 360/78.05, 78.04, 78.07, 70, 71, 47, 73.02

[56] References Cited
U.S. PATENT DOCUMENTS

| | | | |
|---|---|---|---|
| 4,870,643 | 9/1989 | Bultman et al. | 360/98.01 |
| 4,890,045 | 12/1989 | Ishizuka | 360/73.02 |
| 5,159,503 | 10/1992 | Mitamura et al. | 360/73.03 |

Primary Examiner—Aristotelis M. Psitos
Assistant Examiner—Varsha V. Sheladia
Attorney, Agent, or Firm—Wolf, Greenfield & Sacks

[57] ABSTRACT

In a multi-disk system, index equivalent signals from a plurality of disk units are identified, and an average phase value of each disk unit is calculated from the identified signals so that each disk unit can synchronize its rotation phase according to the result of calculation and the index signal thereof in order to eliminate the need for a master index for the synchronization of rotation speed and rotation phase.

7 Claims, 11 Drawing Sheets

WHEN A PHASE SIGNAL IS
DELAYED AND OUTPUTTED

WHEN A PHASE SIGNAL IS
NOT OUTPUTTED

DISK SYNCHRONIZATION CONTROL SYSTEM AND METHOD

BACKGROUND OF THE INVENTION

1. Field of the Invention

The present invention relates to a system and a method for synchronizing rotation speed and rotation phase among a plurality of disk units for writing and reading information.

2. Description of the Prior Art

The capacity of a digital data storage system has recently been expanding, and demand for improvement in its data processing speed has been growing. To meet this demand, the method in which a plurality of magnetic disk units are connected in parallel to expand storage capacity and to increase processing speed has been proposed.

FIG. 9 is a block diagram showing a prior art storage system disclosed in Japanese Patent No. 1-250128 for example. In the figure, reference numeral 1 represents a host computer, 2 an array controller, and 3 a disk controller. A plurality of disk controllers 3 are connected to the array controller 2. 4 indicates magnetic disk units, each of which is connected to the respective disk controller 3. 5 indicates a master index line over which a master index signal from the array controller 2 is sent and which is connected to the magnetic disk units 4.

The operation of the storage system will be described hereafter. Data is written and read out from the host computer 1 through the array controller 2. Data is split into pieces for distribution to the magnetic disk units 4 to reduce processing time. The disk controller 3 sends data split by the array controller 2 to the disk controller 3 for writing on the magnetic disk units 4. Data read out from the magnetic disk units 4 is synthesized by the array controller 2 for transmission to the host computer 1. A master index signal for synchronizing the rotation of the magnetic disk units 4 is outputted from the array controller 2 to the master index line 5. All of the magnetic disk units 4 refer to this master index 5 for synchronization with one another.

FIG. 10 is a block diagram showing the rotation synchronization control circuit of the conventional storage system. In the figure, reference numeral 6 represents a spindle motor control circuit, 7 a spindle motor, 8 a phase detection circuit, and 9 a rotation speed control circuit. 10 represents a rotation phase control circuit, 11 a speed reference signal generator circuit, and 12 a phase signal input circuit. The magnetic disk units of the conventional storage system have a function to synchronize the rotation phase of the spindle motor with the master index signal referred to by the phase signal input circuit 12. The rotation phase control circuit 10 of each disk unit compares the master index signal referred to by the phase signal input circuit 12 with the phase of the rotation phase signal detected by the phase detection circuit 8 provided in the same disk unit to output instructions on the acceleration or deceleration of the spindle motor 7 to the speed reference signal generator circuit 11. The rotation speed control circuit 9 of each disk unit compares the speed reference signal from the speed reference signal generator circuit 11 with the rotation phase signal detected by the phase detection circuit 8 provided in the same disk unit to output instructions on the acceleration or deceleration of the spindle motor 7 to the spindle motor control circuit 6.

Problem to Be Solved by the Invention

Since the conventional magnetic disk system is structured as described in the foregoing, the disk rotation of each magnetic disk unit is synchronized with a respective master index. Therefore, data writing on and reading from a plurality of magnetic disk units can be performed at the same time, thus making it possible to increase data transfer speed when data is split into pieces to be stored in a plurality of magnetic disk units. However, when trouble occurs in this master index circuit, the rotation synchronization of the magnetic disk units of the whole system cannot be achieved, and the system becomes unstable since rotation synchronization depends only on the master index.

If a single magnetic disk unit is operated as a master disk, the system also becomes unstable when trouble occurs in the disk unit designated as the master.

SUMMARY OF THE INVENTION

The present invention has been worked out to solve the aforementioned problems. In view with this, it is therefore an object of the present invention to obtain a highly reliable magnetic disk system which enables the rotation synchronization of a plurality of magnetic disk units without dependence on a master index.

In the disk synchronization control system and method of the present invention, there are provided means for identifying index equivalent signals from a plurality of disk units and calculating an average rotation phase value of each unit from the signals, and phase control means for synchronizing the rotation phase of each unit according to the calculated average rotation phase value, and an index signal from each unit or a signal from a controller.

To facilitate the calculation of an average rotation phase value and the identification of an identification signal for rotation phase synchronization, there is provided means for sending an identification signal having the same number of pulses as synchronized disk units by adding an identification signal for rotation phase synchronization, when necessary, or means for extending pulse width, when an index signal from a disk unit is overlapped with the identification signal for rotation phase synchronization.

Or, each disk unit comprises a phase control method in which the identification signal which is achieved by adding index equivalent signals from a plurality of disk units one after another is used as a common identification signal for rotation phase synchronization to calculate an average rotation phase value from the identification signal and to eliminate the difference between the result of calculation and the index signal of each unit. Each disk unit further comprises a method of adding the common identification signal for rotation phase synchronization, when necessary, to facilitate identification and the calculation of an average rotation phase value.

In the disk synchronization control system and the disk synchronization control method of the present invention, index equivalent signals from disk units are added, when necessary, and sent together to a line for rotation phase synchronization. Each disk unit calculates an average rotation phase value from the identification signal for rotation phase synchronization.

Therefore, a signal transmitted to the line for rotation phase synchronization from each device is a signal in which index equivalent signals are added when necessary.

The above and other objects, features, and advantages of the invention will become more apparent from the following description when taken in conjunction with the accompanying drawings.

DESCRIPTION OF THE PREFERRED EMBODIMENT

Embodiment 1 (corresponding to claims 1 and 2)

An embodiment of the present invention will be described with reference to the accompanying drawings.

Figure 1:
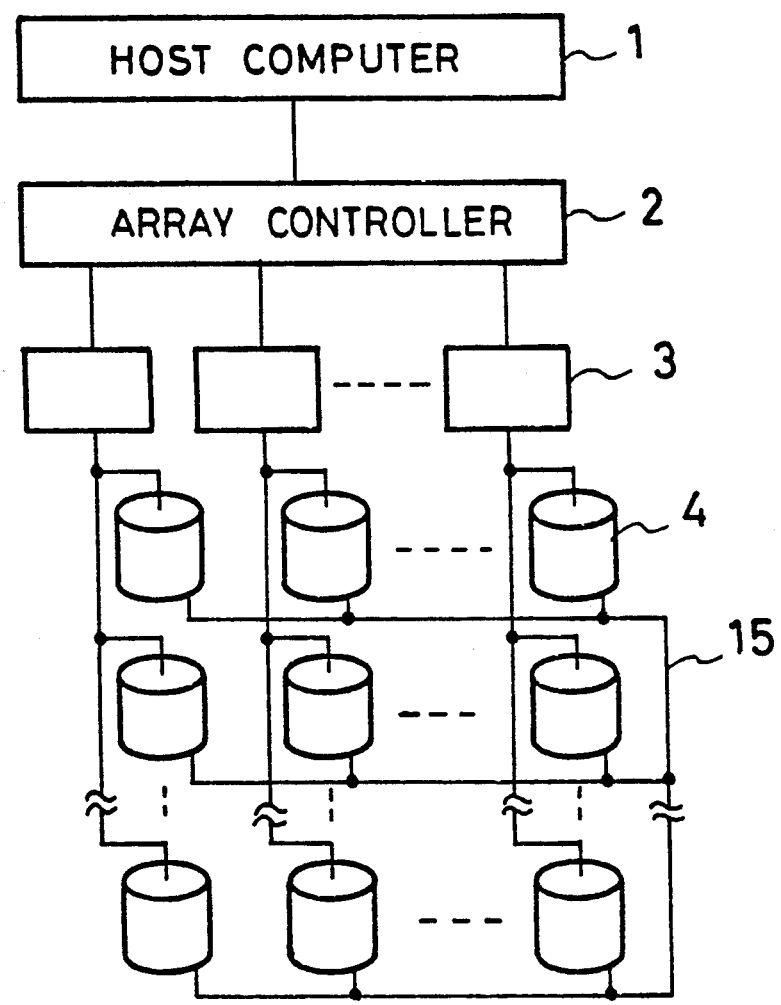
FIG. 1 is a system block diagram explaining magnetic disk units according to an embodiment of the present invention.

FIG. 1 is a block diagram illustrating the embodiment wherein the present invention is applied to magnetic disk units. In the figure, reference numeral 15 represents a synchronous signal line which is connected to a plurality of magnetic disk units 4.

Figure 2:
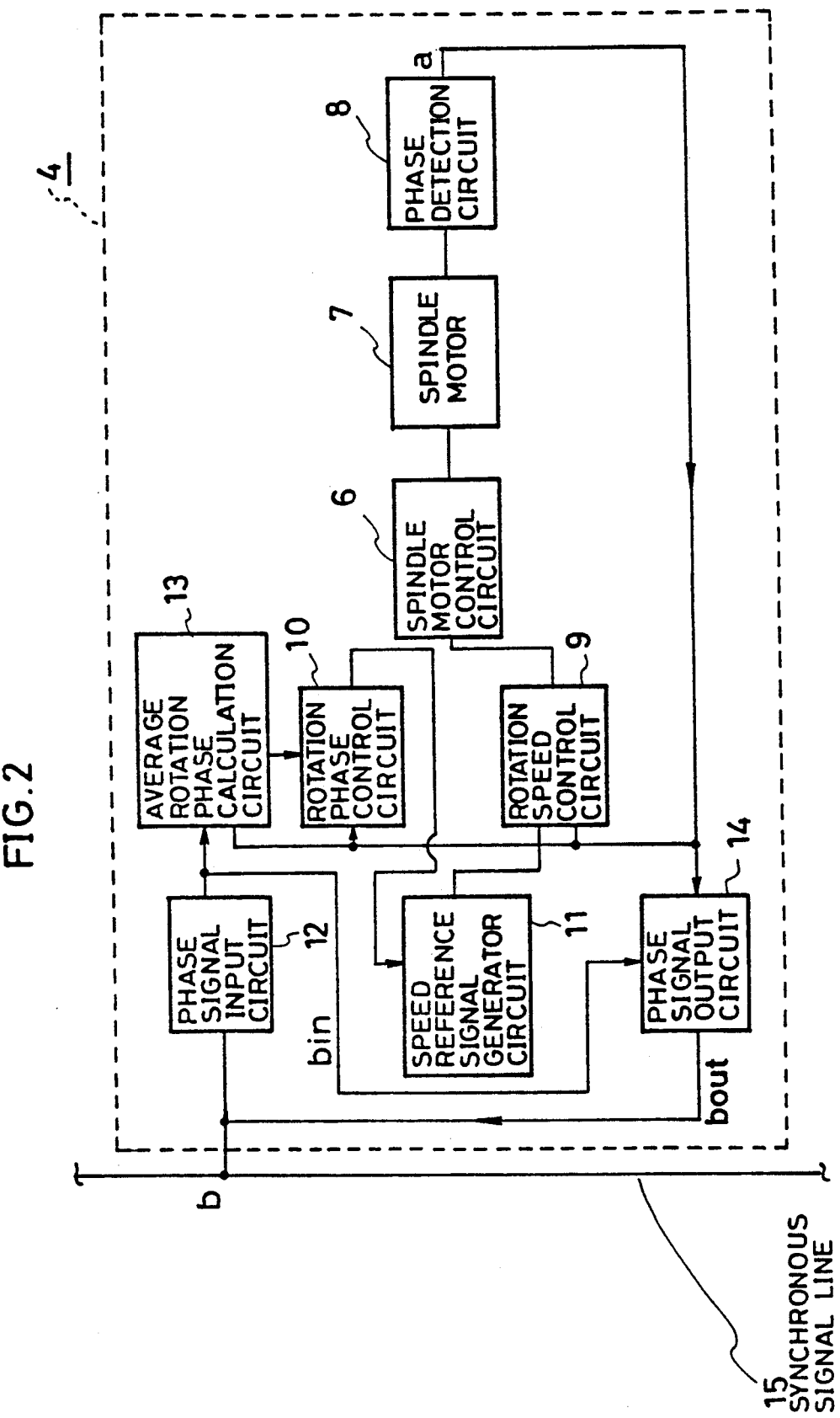
FIG. 2 is a control block diagram of a rotation synchronization control system in each magnetic disk unit of the embodiment.

FIG. 2 is a block diagram of a rotation phase synchronization control system in each disk unit of the embodiment of the present invention. In the figure, reference numeral 13 represents an average rotation phase calculation circuit which is newly provided, and 14 a phase signal output circuit which is also newly provided. In the magnetic disk control system of the present invention, the rotation phase signal of each magnetic disk unit 4 is outputted to the synchronous signal line 15 through the phase signal output circuit 14. The rotation phase control of each magnetic disk unit 4 is carried out by averaging the rotation phase signals of all the magnetic disk units 4 connected to the synchronous signal line 15 with the average rotation phase calculation circuit 13 and by synchronizing each magnetic disk unit with the thus obtained average rotation phase.

Figure 3:
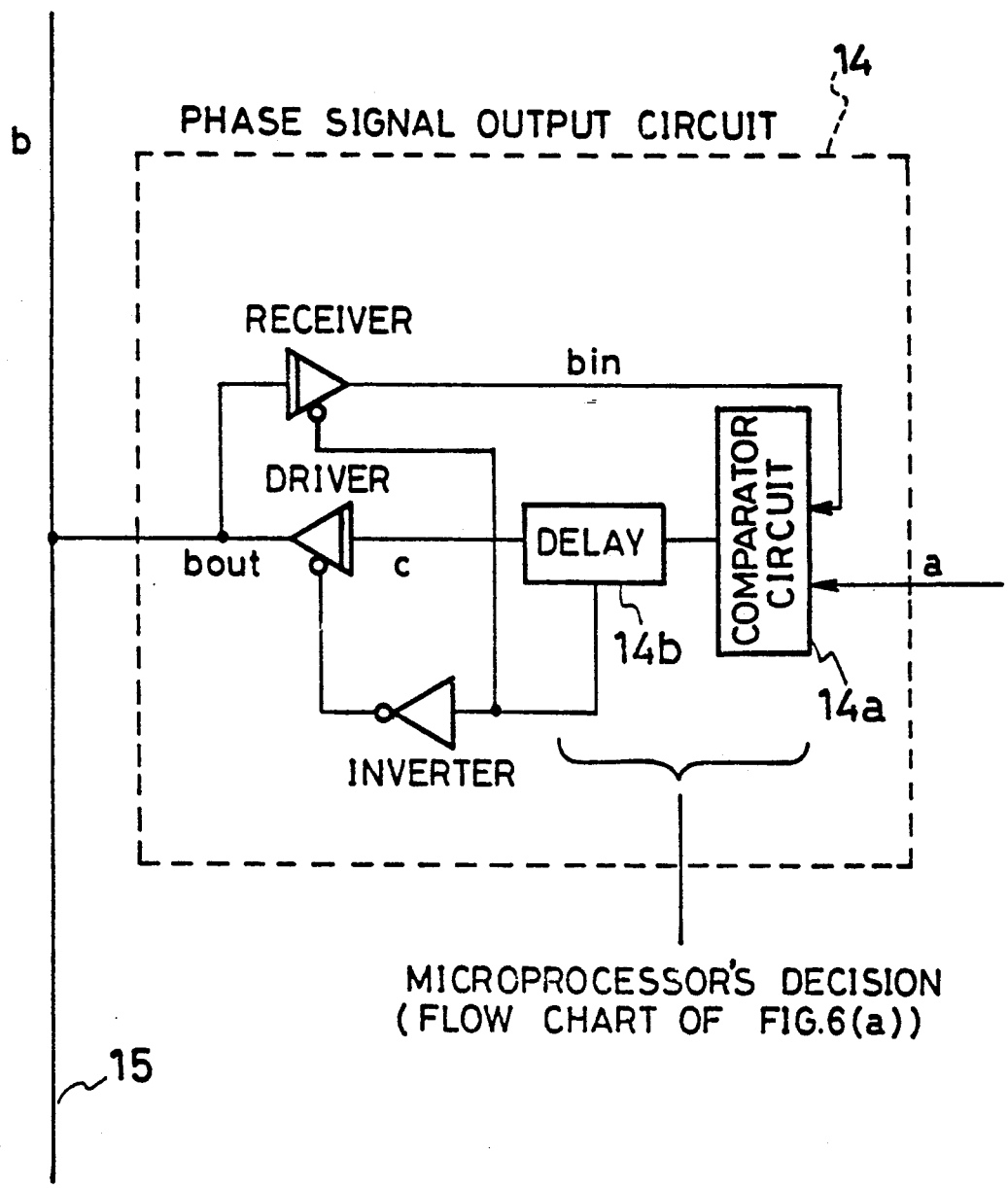
FIG. 3 is a circuit block diagram of the phase signal output circuit of the rotation synchronization control system.
Figure 6A:
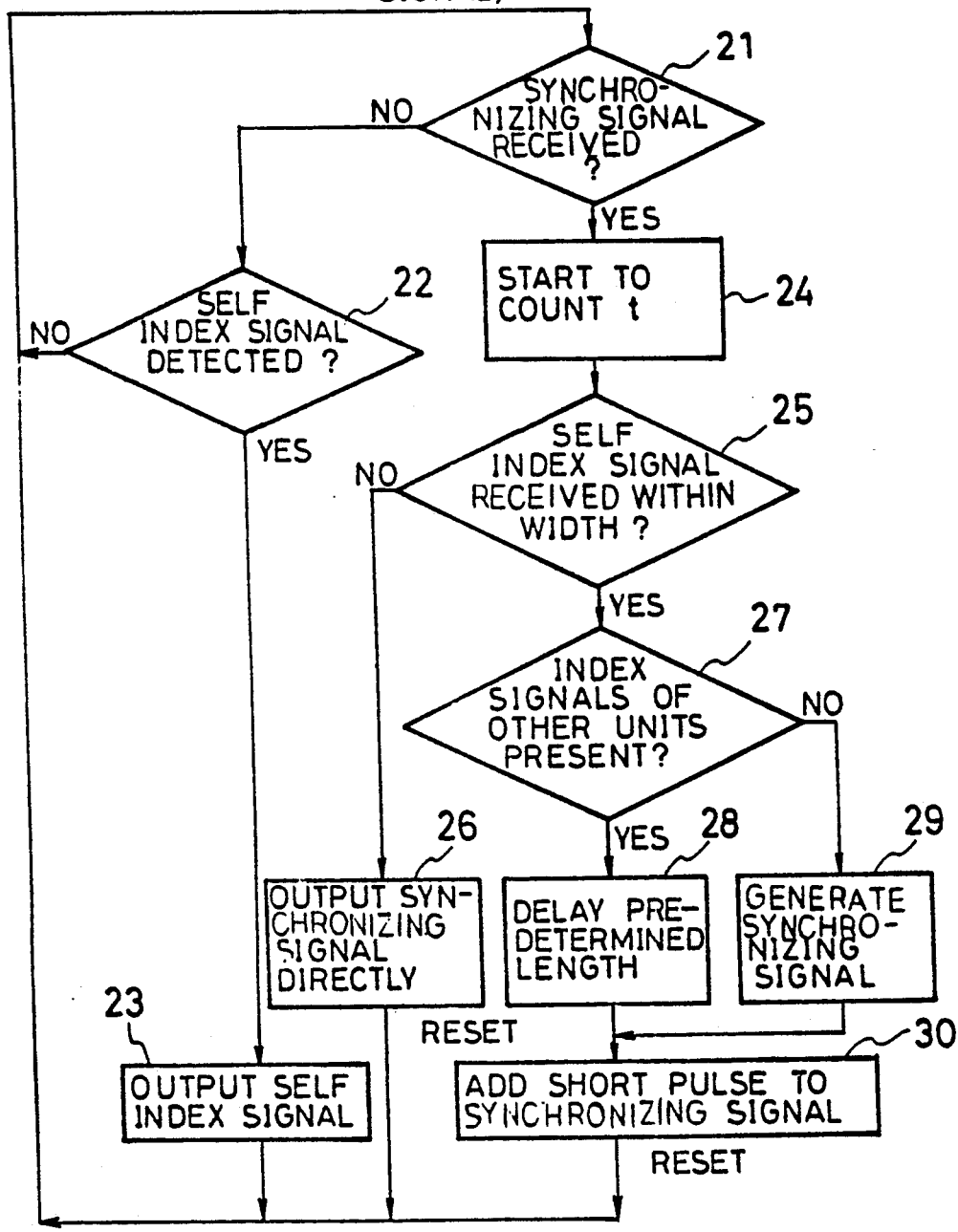
FIG. 6a-b is an operational flow chart of the phase signal output circuit and the average rotation phase calculation circuit of the embodiment.

FIG. 3 shows details of the phase signal output circuit of FIG. 2. In the figure, a comparator circuit 14a and a delay circuit 14b have functions shown in the flow chart of FIG. 6(a) which will be described hereafter, and are constituted by a microprocessor or other devices.

Figure 4:
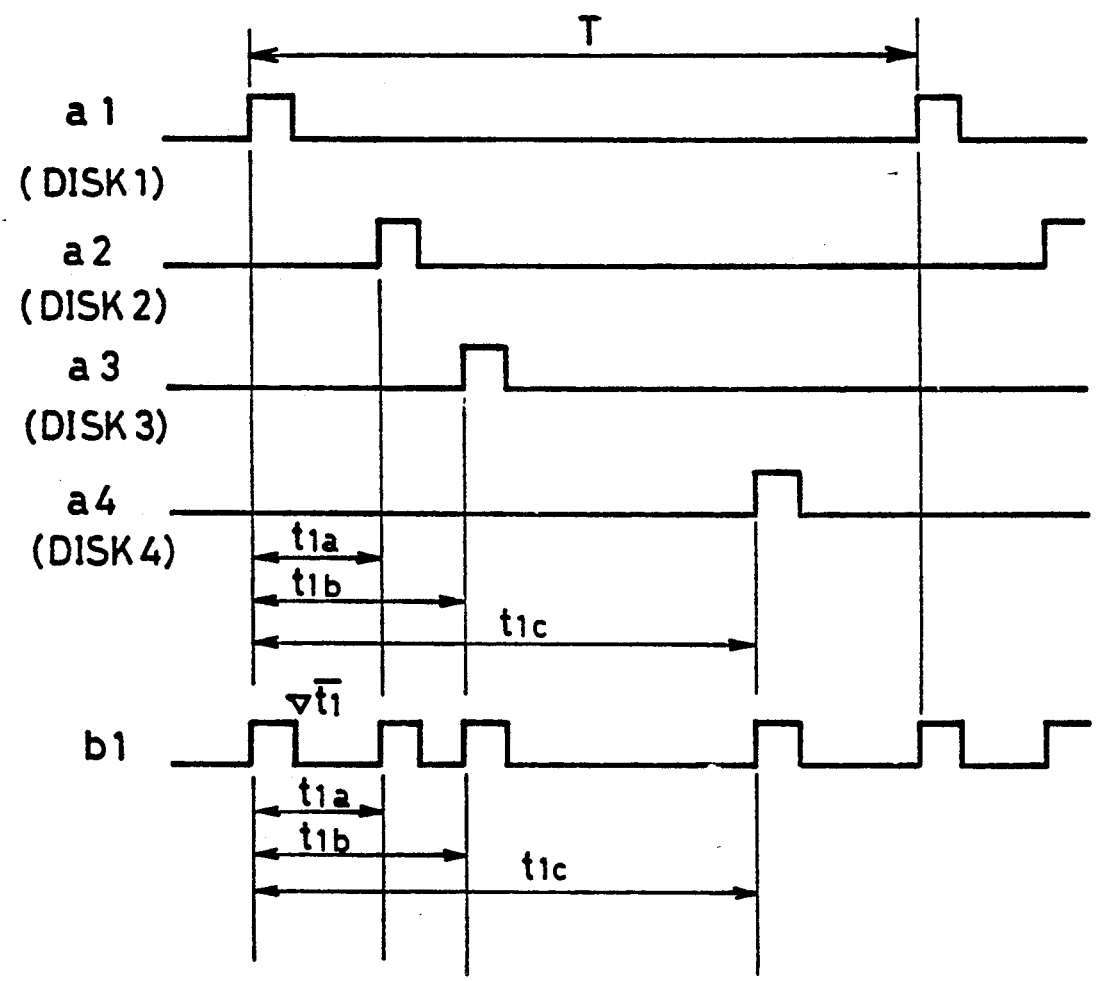
FIG. 4 is a time chart illustrating the operation of the embodiment.

The operation of the circuit will be described below. FIG. 4 is a time chart explaining the operation of the embodiment of the present invention in which all of the disk units are not synchronized with one another. In the figure, a represents the index output of each device which is the output of the phase detection circuit 8 of FIG. 2. a1, a2, a3 and a4 represent the outputs of the phase detection circuits of magnetic disks 1, 2, 3 and 4, respectively. b represents the waveform of the synchronous signal line, and b1 represents an OR signal of a1, a2, a3 and a4, each of which is outputted to the synchronous signal line independently when the four devices are not synchronized with one another.

FIG. 5 (a) illustrates a state in which three of the disk units are synchronized with one another. In the figure, bin represents an index equivalent signal over the synchronous signal line to be inputted into the third unit. In this example, two other units have already outputted identification signals. Meanwhile, the third unit detects a3 as the output of the internal phase detection circuit 8. a3 occurs within a synchronization width in this example. Then a short pulse C3 is generated in the phase signal output circuit 14 after checking with the bin signal that the identification signal including a short pulse is 0 level during a predetermined period of t3 seconds. C3 is added to bin to be outputted in the form of bout from the phase signal output circuit of the unit to the synchronous signal line.

In FIG. 5(i a), when a disk unit is first synchronized with the index signal a of another disk unit, namely only two disk units have just begun to be synchronized with each other, an identification signal for synchronization is generated over the synchronous signal line. In concrete terms, the phase signal output circuit 14 sends the identification signal in the form of a pulse having a predetermined time width W according to the flow chart of FIG. 6(a) which will be described hereafter.

FIG. 5 (b) is a time chart illustrating a state in which four disk units are synchronized with one another. In the figure, it is understood from bin to be received by the fourth unit over the synchronous signal line that three of the units are already synchronized with one another. A short pulse C4 is generated based on an index signal a4 from the fourth unit after a predetermined time t4 set to the unit. These different predetermined times t3 and t4 are set to each disk unit, which makes it possible to know the number of synchronized disk units in any case.

When the internal index signal of the fourth unit which is not synchronized with other units as shown by the dotted line of a4 is detected, the signal is outputted to bout as shown by the dotted line in the figure.

FIG. 6 (a) is a flow chart explaining the operation of the phase signal output circuit 14 of FIG. 2 which has been already described with reference to FIG. 5 (a) and FIG. 5(b).

Figure 6B:
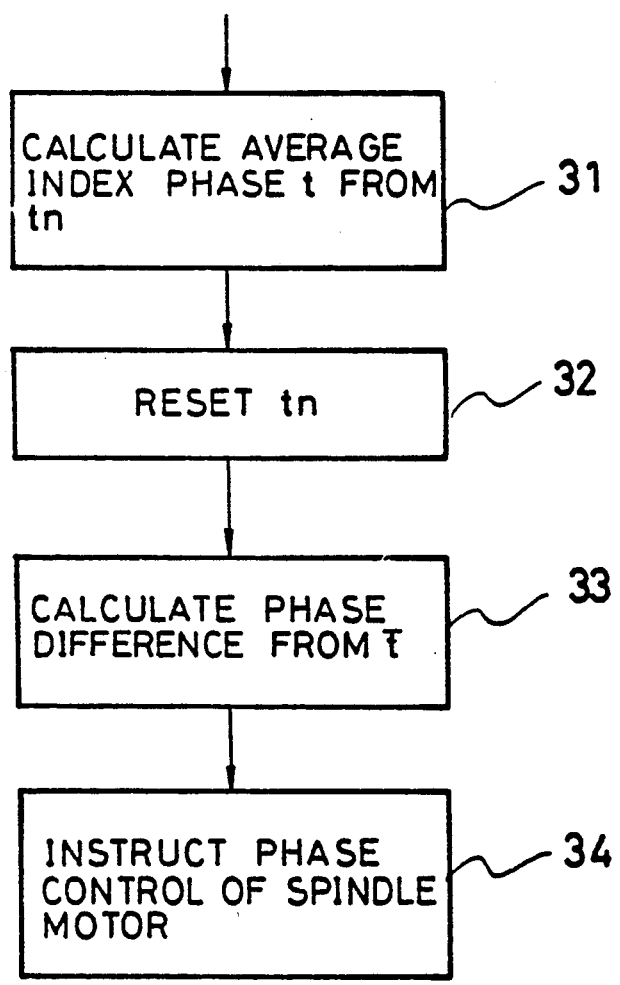

FIG. 6(b) is a flow chart explaining the operation of the average rotation phase calculation circuit 13 of FIG. 2. The operation will first be described with reference to FIG. 3. When a disk unit is not synchronized with other disk units, the average rotation phase calculation circuit 13 of the unit calculates an average rotation phase value tM from pulses over the synchronous signal line during a single rotation cycle from the time when an index signal begins to be generated as a rotation phase signal detected by the unit.

In FIG. 4, there are shown four disk units, and a single rotation time T is 15 ms. Since T is 16 ms, a delay of 8 ms or more is the advance of 16's complement.

The second, third and fourth disk units each generate an index signal after the elapse of t1a, t1b and t1c seconds, respectively. t1a is 3 ms, t1b 5 ms, and t1c minus 4 ms (12 −16). In this case, tM is obtained from the following equation:

$$tM = (0+3+5-4)/4 = 1$$

Therefore, an average rotation phase value is 1 ms. Namely, if this disk unit delays its phase by 1 ms, and other disk units also control their phases, synchronization among these disk units is made possible with a slight amount of control.

Figure 5A:
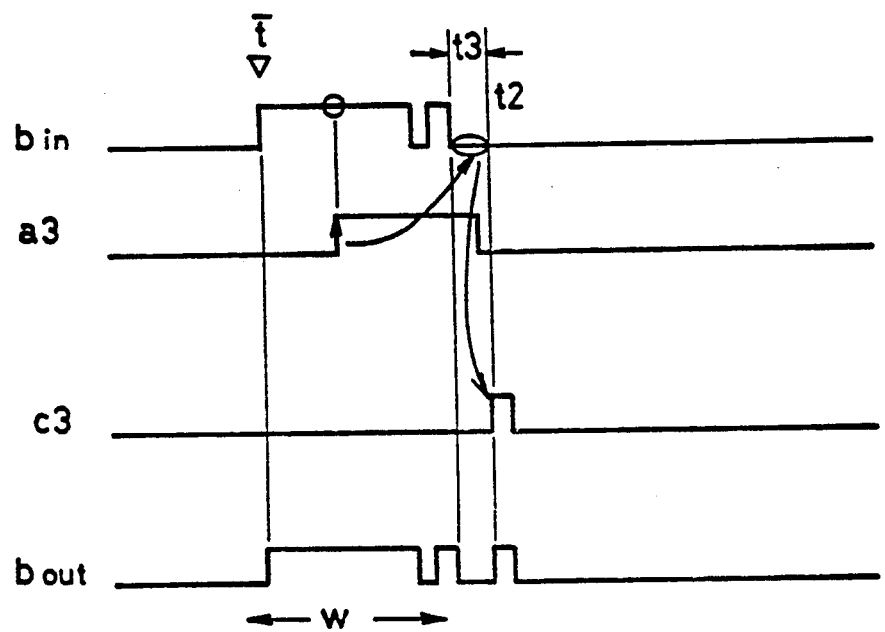
FIG. 5a-b is a time chart illustrating the operation of the embodiment when some of the disk units are synchronized with one another.
Figure 5B:
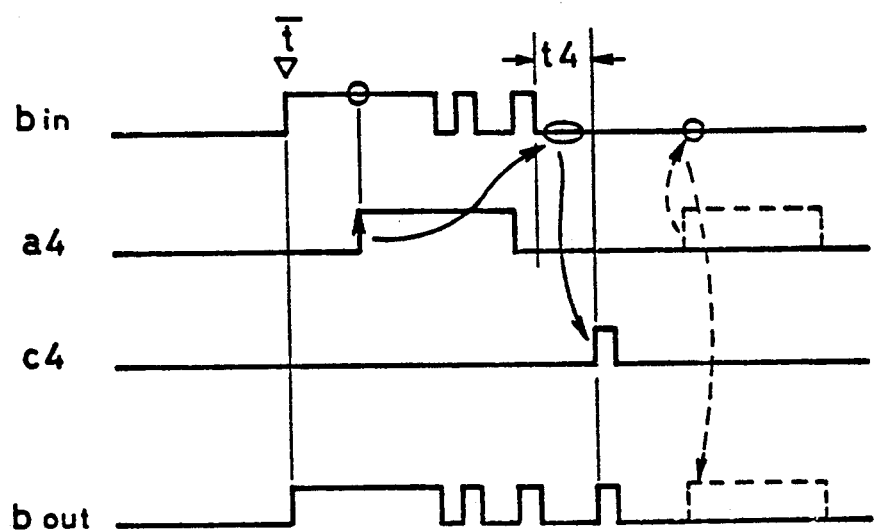

The state shown by the dotted line of FIG. 5(a) or FIG. 5(b) is that when three disk units are synchronized with one another. The phase is considered to be identical among these synchronized units. Therefore, if in the state shown by the dotted line of FIG. 5(b), the unit of the dotted line has a delay of 3 ms, the average phase calculation circuit of the unit calculates an average rotation phase value from the following equation for phase control for synchronization.

$$tM = (0 \times 3 + 3)/4 = 0.75 \text{ ms}$$

Embodiment 2 (corresponding to claims 1 and 3)

Figure 7A:
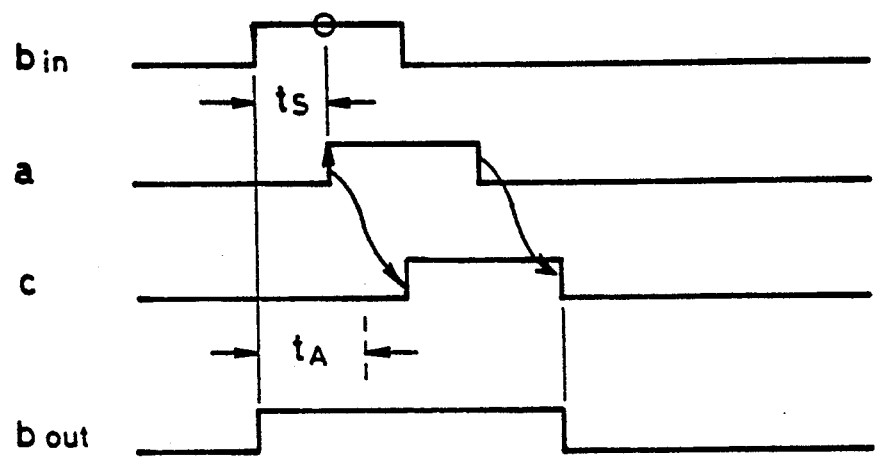
FIG. 7a-b is a time chart illustrating the operation of another embodiment of the present invention when some of the disk units are synchronized with one another.
Figure 8:
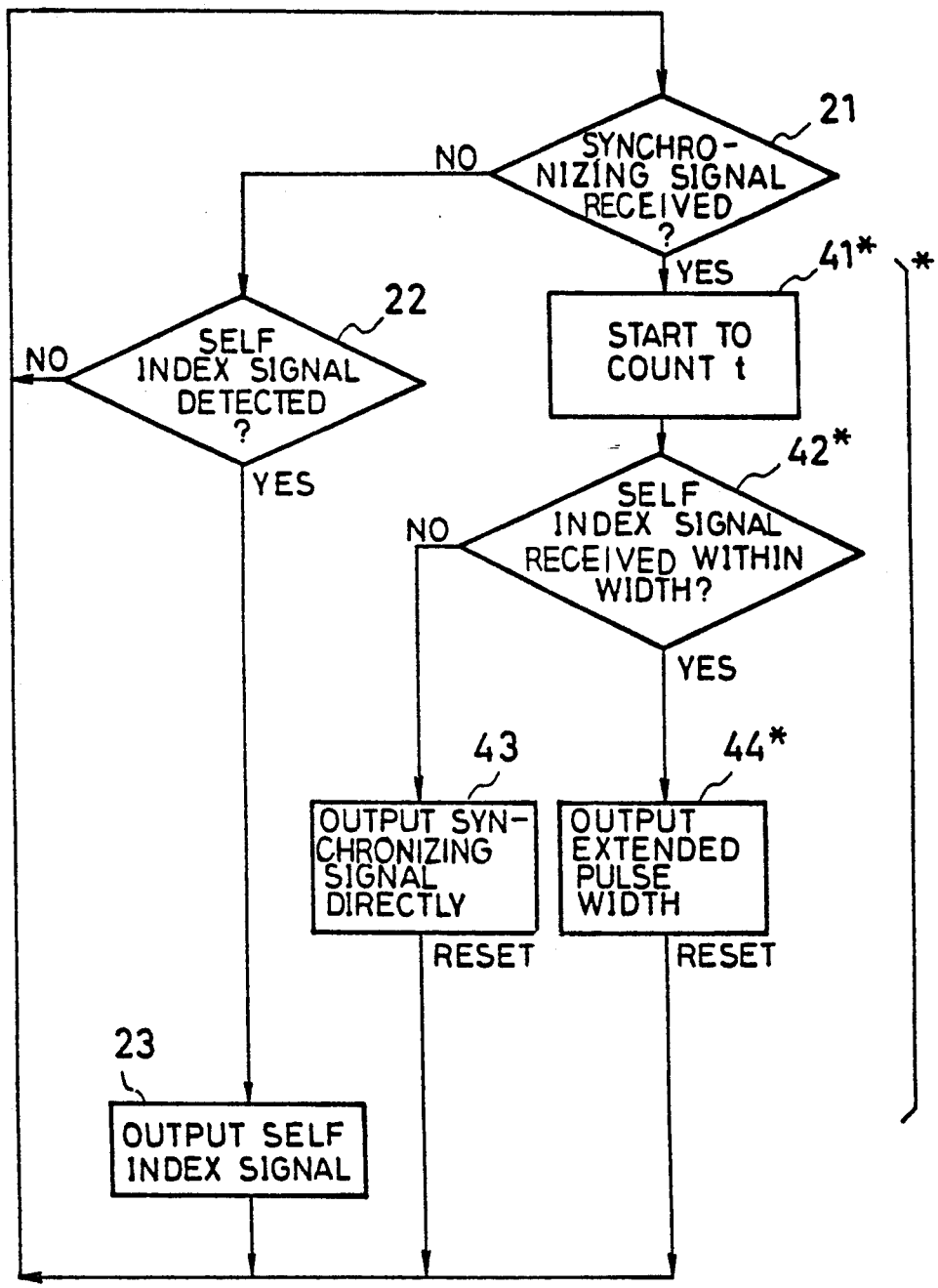
FIG. 8 is an operational flow chart of a phase signal output circuit according to another embodiment of the present invention.
Figure 9:
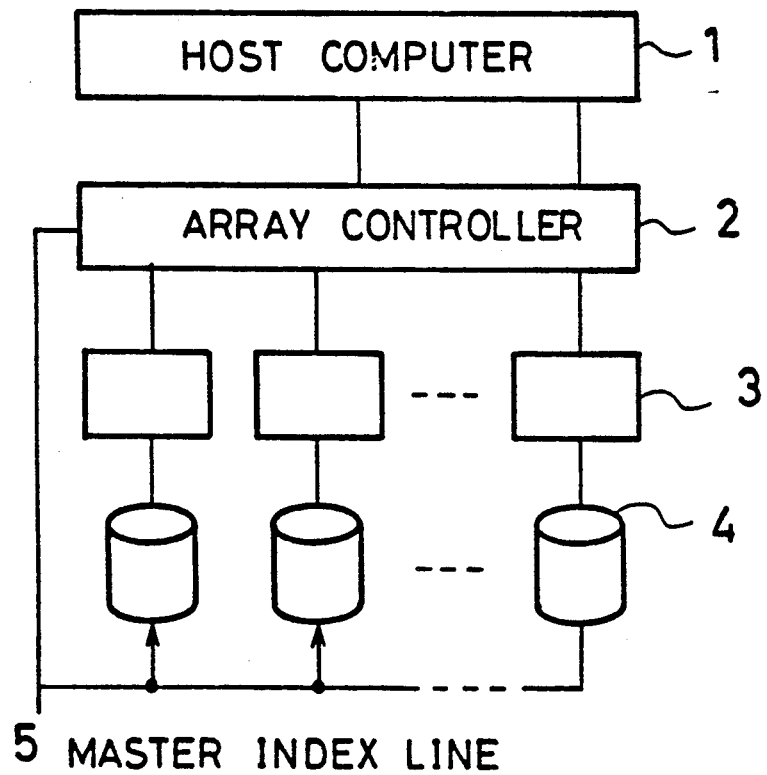
FIG. 9 is a block diagram of the conventional magnetic disk system.
Figure 10:
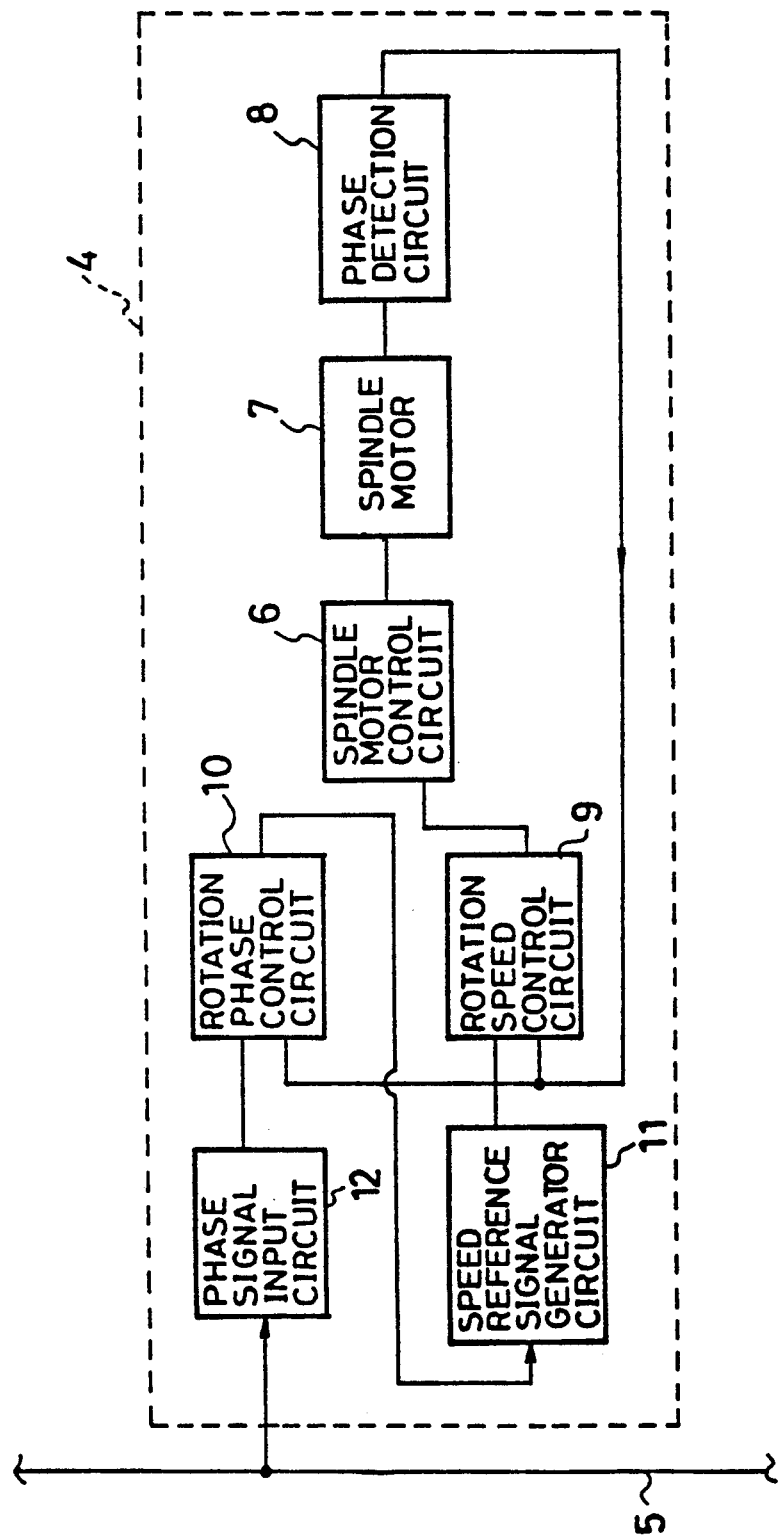
FIG. 10 is a block diagram of the rotation synchronization control device of the conventional magnetic disk system.

In the above embodiment, a short identification pulse is generated when two or more disk units are synchronized with one another. Another simple embodiment of the present invention will be described hereafter. In the embodiment described below, synchronized units do not generate short pulses for identification, but expand the width of the first signal for rotation phase synchronization until it reaches a predetermined width. FIG. 7(a) is an illustration of the operation, and FIG. 8 is a flow chart illustrating the operation of the phase signal output circuit in that case. Namely, in FIG. 7(a), if a disk unit detects an index signal a thereof and at the same time an identification signal bin for rotation phase synchronization over the synchronous signal line 15, the unit generates a pulse c by delaying the index signal a. A new identification signal for rotation phase synchronization to be sent to the synchronous signal line 15 is in the form of bout. In this way, the operation of the phase signal output circuit is simpler in the second embodiment than the first embodiment. In this embodiment, weighting with the number of disk units is weakened, but its hardware is simpler.

Embodiment 3 (corresponding to claims 1 and 3)

Figure 7B:
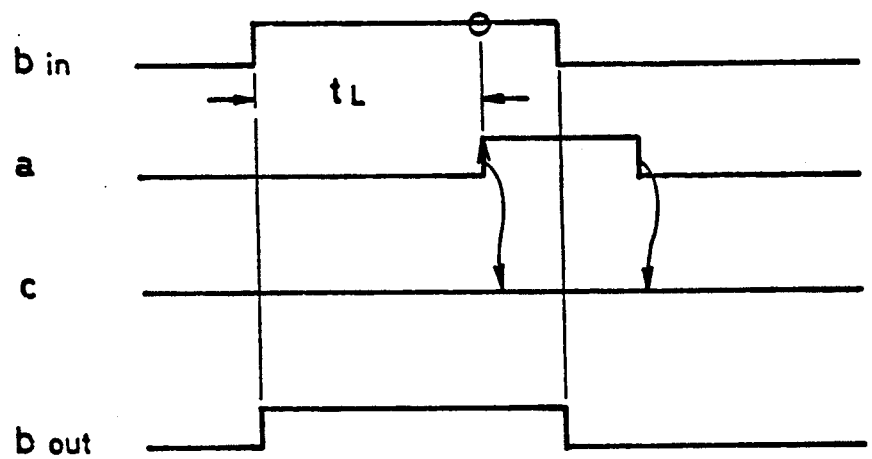

Referring to FIG. 7(a), it has been explained that the width of the identification signal is expanded to a certain width by adding the index signal to the identification signal. If the index signal of a disk unit is detected within a delay of tS seconds during a predetermined time of less than tA seconds from the start of the identification signal, the signal is added to the identification signal. As shown in FIG. 7(b), if the index signal of the unit is detected after the elapse of tL seconds which is longer than tA, the index signal may not be added to the identification signal which may then be re-transmitted directly.

Embodiment 4 (corresponding to claim 3)

Another simpler embodiment of the present invention will be described hereafter. FIG. 7(b) illustrates that the index signal is not added when the signal is detected after the elapse of tL seconds which is longer than tA. In Embodiment 3, after the formation of an identification signal, the width of the first signal for rotation phase synchronization is not changed. This simplifies the structure of the phase signal output circuit 14. That is, in FIG. 7(b), even if a disk unit detects the index signal a thereof and at the same time the identification signal bin over the synchronous signal line 15, the phase signal output circuit 14 simply outputs the same signal as bin as an identification signal bout for rotation phase synchronization. As a result, steps 41, 42 and 43 shown in the right bottom of the flow chart of FIG. 8 are not required.

Embodiment 5

In the above embodiments, the rotation speed control circuit 9, the rotation phase control circuit 10, the average rotation phase calculation circuit 13, the phase signal output circuit 14 and other components are shown separately, but these functions may be integrated by a microprocessor.

Embodiment 6

In the previous embodiments, the synchronous signal line 15 is connected to all of the disk units. The disk units may be divided into some groups, and a synchronous signal line may be provided for each group for synchronization control of each group.

Embodiment 7

In the aforementioned embodiments, an average rotation phase calculation circuit is provided in each disk unit. For example, a single average rotation phase calculation circuit may be provided in a disk controller or other components to send a phase difference obtained from the result of calculation to each unit over a command or other line. Each unit controls rotation phase thereof based on the transmitted phase difference.

Embodiment 8

In all of the previous embodiments, the present invention is applied to magnetic disk units for comparison with the prior art. If the present invention is applied to other types of disk units for writing, writing/reading and reading information such as an optical disk unit and an optical magnetic disk unit, the same effects can be achieved.

As described in the foregoing, according to the present invention, there are provided means for identifying index equivalent signals generated from a plurality of disk units and calculating an average rotation phase value, and phase control means for synchronizing the rotation phases of the disk units. Therefore, even if trouble occurs in any index signal generation circuit, the influence of the trouble on the disk units can be minimized, thus enhancing synchronization stability.

What is claimed is:

1. A disk synchronization control system including a plurality of disk units having rotation phase signal outputs and a single disk controller, wherein each said disk unit comprises:

means for receiving a composite rotation phase identification signal formed by combining rotational phase signals output from said plurality of disk units;

means for calculating an average rotation phase value to which each of said plurality of disk units is to be synchronized; and means for synchronizing the rotation phase signal output of said disk unit with the calculated average rotation phase value.

2. The disk synchronization control system according to claim 1, wherein each of said disk units further comprises means for sending as part of said identification signal for rotation phase synchronization, output delayed by a predetermined time when a rotation phase signal from a disk unit is overlapped with the preceding rotation phase signals of other disk units within said identification signal for rotation phase synchronization so that it is not overlapped with the rotation phase signals of other disk units.

3. The disk synchronization control system according to claim 1, wherein each of said disk units further comprises mean for sending as part of said identification signal for rotation phase synchronization, continuous output to the rotation phase signals of other disk units directly or when necessary when the rotation phase signal from a disk unit is overlapped with the preceding rotation phase signals of other devices within said identification signal for rotation phase synchronization.

4. A disk synchronization control system including a plurality of disk units and a single disk controller, wherein said disk controller comprises:

means for receiving a composite rotation phase signal including a rotation phase indication for each of said plurality of disk units;

means for calculating an average rotation phase value thereof, and means for supplying to each of said plurality of disk units a signal indicative of a phase difference between the calculated average rotation phase value and a rotation phase signal output by each of said plurality of disk units, respectively.

5. A disk synchronization control method for controlling the synchronization of a plurality of disk units which are controlled by a single disk controller, comprising the steps of:

combining a plurality of rotation phase signals from said plurality of disk units to form a common identification signal for rotation phase synchronization, identifying the number of synchronized disk units by detecting said common identification signal, calculating an average rotation phase value from the difference between a phase of the rotation phase signal of a disk unit and phases of rotation phase signals of other disk units by weighting with the number of units, and controlling the rotation phase thereof for synchronization based on the result of calculation.

6. A disk synchronization control method for controlling the synchronization of a plurality of disk units for writing and reading information which are controlled by a single disk controller, comprising the steps of:

adding a plurality of rotation phase signals from said plurality of disk units to form a common identification signal for rotation phase synchronization, calculating an average rotation phase value from the difference between a phase of a rotation phase signal of a disk unit and phases of rotation phase signals of other units, the rotation phase signals derived from said identification signal, controlling the rotation phase thereof for synchronization based on the result of calculation, and sending as a common identification signal for rotation phase synchronization an identified portion directly when the rotation phase signal thereof is not overlapped with a preceding common identification signal for rotation phase synchronization, and a signal formed by adding said identified portion to the overlapped signal when the rotation phase signal thereof is overlapped with a preceding common identification signal for rotation phase synchronization.

7. A disk synchronization control system including a plurality of disk units and a single disk controller connected to a host computer, wherein said disk controller comprises:

means for receiving a composite rotation phase signal which is formed by adding rotation phase signals output from said plurality of disk units;

means for calculating an average rotation phase value for synchronizing all of said disk units based on the composite rotational phase signal; and means for supplying a phase difference between the calculated average rotational phase value and each rotational phase signal output from each of said plurality of disk units according to instructions from a control circuit in the host computer connected to said disk controller.

* * * * *